US008064598B2

(12) United States Patent
Vaha-Sipila et al.

(10) Patent No.: US 8,064,598 B2
(45) Date of Patent: Nov. 22, 2011

(54) APPARATUS, METHOD AND COMPUTER PROGRAM PRODUCT PROVIDING ENFORCEMENT OF OPERATOR LOCK

(75) Inventors: Antti Vaha-Sipila, Helsinki (FI); Jarkko Oikarinen, Oulunsalo (FI)

(73) Assignee: Nokia Corporation, Espoo (FI)

( * ) Notice: Subject to any disclaimer, the term of this patent is extended or adjusted under 35 U.S.C. 154(b) by 872 days.

(21) Appl. No.: 12/072,712

(22) Filed: Feb. 26, 2008

(65) Prior Publication Data

US 2008/0209206 A1 Aug. 28, 2008

Related U.S. Application Data

(60) Provisional application No. 60/903,816, filed on Feb. 26, 2007.

(51) Int. Cl.
*H04K 1/00* (2006.01)
(52) U.S. Cl. ............ 380/247; 726/3; 713/155; 713/168; 380/59; 380/270; 455/435.1
(58) Field of Classification Search .................. None
See application file for complete search history.

(56) References Cited

U.S. PATENT DOCUMENTS

| | | | | |
|---|---|---|---|---|
| 6,816,900 | B1 * | 11/2004 | Vogel et al. ................ | 709/225 |
| 7,844,834 | B2 * | 11/2010 | Leone et al. ................ | 713/193 |
| 7,953,971 | B2 * | 5/2011 | Brown et al. ............... | 713/156 |
| 2003/0014365 | A1 * | 1/2003 | Inada et al. ................ | 705/50 |
| 2004/0162998 | A1 | 8/2004 | Tuomi et al. ............... | 713/202 |
| 2004/0236965 | A1 * | 11/2004 | Krohn ........................ | 713/201 |
| 2004/0260928 | A1 * | 12/2004 | Immonen ................... | 713/175 |
| 2005/0021969 | A1 * | 1/2005 | Williams et al. ........... | 713/176 |
| 2005/0066057 | A1 * | 3/2005 | Thorstensson et al. ..... | 709/246 |
| 2006/0002556 | A1 * | 1/2006 | Paul ............................ | 380/270 |
| 2006/0129848 | A1 * | 6/2006 | Paksoy et al. .............. | 713/193 |
| 2006/0246872 | A1 * | 11/2006 | Tarkkala ..................... | 455/411 |
| 2006/0293030 | A1 | 12/2006 | Cantini et al. .............. | 455/411 |
| 2007/0055873 | A1 * | 3/2007 | Leone et al. ................ | 713/168 |
| 2007/0101025 | A1 * | 5/2007 | Brown et al. ............... | 709/248 |
| 2007/0136282 | A1 * | 6/2007 | Takashima .................. | 707/6 |
| 2008/0003980 | A1 * | 1/2008 | Voss et al. .................. | 455/411 |
| 2008/0005577 | A1 * | 1/2008 | Rager et al. ................ | 713/183 |
| 2008/0082828 | A1 * | 4/2008 | Jennings et al. ............ | 713/176 |
| 2008/0108321 | A1 * | 5/2008 | Taaghol et al. ............. | 455/410 |
| 2008/0108322 | A1 * | 5/2008 | Upp ............................ | 455/411 |
| 2008/0148044 | A1 * | 6/2008 | Upp et al. ................... | 713/156 |

OTHER PUBLICATIONS

B. Aboba, et al, RFC 2716 (RFC2716) PPP EAP TLS Authentication Protocol, Oct. 1999, 19 pgs. R. Housley, et al, RFC 2459, Internet x.509 Public Key Infrastructure Certificate and CRL Profile, Jan. 1999, 115 pgs.
T. Dierks, et al, RFC2246 The TLS Protocol Version 1.0, 72 pgs.
P. Funk, EAP Tunneled TLS Authentication Protocol (EAP-TTLS), Feb. 2002, 38 pgs.

* cited by examiner

*Primary Examiner* — Nasser Moazzami
*Assistant Examiner* — Oscar Louie
(74) *Attorney, Agent, or Firm* — Harrington & Smith (57) ABSTRACT

A data blob has an operator's certificate that specifies a network. The data blob is encrypted by the network using a private key that authenticates that a user device owns a MAC address. The network sends the encrypted data blob to the user device, which decrypts it using a private key that is locally stored in the user device. From that the user device obtains the operator's certificate, locks the user device to a network specified by the operator's certificate, and sends a response message signed with the private key. The network grants access to the user device based on the signed response message. Various embodiments and further details are detailed. This technique is particularly useful for a WiMAX or WLAN/WiFi network in which there is no SIM card to lock the device to the network.

27 Claims, 3 Drawing Sheets

APPARATUS, METHOD AND COMPUTER PROGRAM PRODUCT PROVIDING ENFORCEMENT OF OPERATOR LOCK

CROSS-REFERENCE TO RELATED APPLICATION

This application claims priority to U.S. Provisional Patent Application No. 60/903,816, filed on Feb. 26, 2007, the contents of which are incorporated herein in its entirety.

TECHNICAL FIELD

The exemplary and non-limiting embodiments of this invention relate generally to wireless communication systems, methods, devices and computer program products and, more specifically, relate to techniques to authenticate a terminal in a network.

BACKGROUND

Various abbreviations that appear in the specification and/or in the drawing figures are defined as follows:
3G third generation mobile phone network
EAP-TLS extensible authentication protocol-TLS
EAP-TTLS: extensible authentication protocol-TTLS
GNU/Linux system having a Linux kernel and GNU (GNU's Not Unix) software
GSM global system for mobile communications
IMSI international mobile subscriber identity
MAC address media access control address (the link-layer device address)
PKMv2 privacy and key management protocol version 2 (IEEE 802.16e-2005)
SIM subscriber identity module
TLS transport layer security
TTLS tunneled transport layer security
WiFi wireless fidelity
WiMAX world interoperability for microwave access (IEEE 802.16e network)
WLAN wireless local access network
X.509 X.509 certificate The following publications may be of interest to the ensuing description, and each are incorporated by reference in their entirety:
The TLS Protocol, Version 1.0, T. Dierks, C. Allen, January 1999, RFC 2246;
PPP EAP TLS Authentication Protocol, B. Aboba, D. Simon, October 1999, RFC 2716;
EAP Tunneled TLS Authentication Protocol (EAP-TTLS), P. Funk, S. B. Wilson, February 2002, IETF PPPEXT Working Group, Internet Draft RFC; and
Internet X.509 Public Key Infrastructure Certificate and CRL Profile, R. Housley, W. Ford, W. Polk, D. Solo, January 1999, RFC 2459.

WiMAX network operators may have an interest in subsidy locking devices to their mobile WiMAX networks. Since it can be expected that mobile devices will be commodity items purchased from retail consumer electronics stores, it can be anticipated that locking and unlocking the mobile devices will be accomplished over-the-air (i.e., not at a dealer and/or operator location). WiMAX, as a protocol, does not specifically support subsidy locking, and further there may be no removable SIM card to facilitate a subsidy locking operation. As a result, if subsidy locking is to be achieved then it must be implemented utilizing inherent properties of the WiMAX network.

Further, at least one type of WiMAX mobile device known to the inventors is expected to rely on an open GNU/Linux-based platform to enable Internet access. In this case no non-hackable security services can be implemented in the kernel or user space.

In GSM and 3G phones a subsidy lock feature is known as a "SIM lock", where the IMSI of the SIM card defines a specific operator. The GSM or 3G phone can be factory programmed to reject any other SIM cards than those having a specific IMSI numbering block. Such phones that are SIM-locked before sale can be unlocked by entering a code provided by the specific operator.

SUMMARY

In accordance with one embodiment of the invention is a method that includes receiving an encrypted data blob at a device, then decrypting the data blob using a private key that is locally stored in the device to obtain an operator's certificate from the data blob, locking the device to a network specified by the operator's certificate, and sending a response message signed with the private key.

In accordance with another embodiment of the invention is an apparatus that includes a memory, a receiver, a processor and a transmitter. The memory stores a private key. The receiver is configured to receive an encrypted data blob. The processor is configured to decrypt the data blob using the private key and thereby obtain from the data blob an operator's certificate, and to lock the apparatus to a network that is specified by the operator's certificate. The transmitter is configured to send a message signed with the private key once the apparatus is locked to the network.

In accordance with another embodiment of the invention is a memory embodying a computer program executable by a digital processing apparatus to perform operations directed to locking a device to a network. In this embodiment of the invention the operations include decrypting a received encrypted data blob using a private key that is locally stored on a device to obtain an operator's certificate from the data blob, locking the device to a network that is specified by the operator's certificate, and sending a response message that is signed with the private key.

In accordance with still another embodiment of the invention is an apparatus that includes memory means, receiving means, processing means, and sending means. The memory means is for storing a private key. The receiving means is for receiving an encrypted data blob. The processing means is for decrypting the data blob using the private key and thereby obtaining from the data blob an operator's certificate, and for locking the apparatus to a network that is specified by the operator's certificate. The sending means is for sending a message signed with the private key once the apparatus is locked to the network. In a particular embodiment the memory means includes a protected application that is embodied on a local memory of the apparatus, the receiving means includes a wireless receiver, the processing means includes a digital processor, and the sending means includes a wireless transmitter.

In accordance with yet another embodiment of the invention is a method that includes encrypting a data blob with a private key, the data blob comprising an operators certificate which specifies a network, then sending the encrypted data blob to a user device, then receiving from the user device a response message signed with the private key. The response message indicates that the user device has been locked to the network that is specified by the operator's certificate. Responsive to receiving the response message, access is granted for the user device to the network that is specified by the operator's certificate.

These and other aspects are detailed further below.

DETAILED DESCRIPTION

The exemplary embodiments of this invention are directed to mobile WiMAX (IEEE 802.16e) terminals and networks, and more specifically are directed to subsidy (operator) locking of devices to the network by controlling access to a device private key using a protected application. WiMAX implementation is not a limit to the scope of the invention, but is simply the environment of the specific examples presented herein.

According to a current plan of the WiMAX Forum each mobile WiMAX device contains a private key (and a related public key plus a certificate). The WiMAX network may request device authentication, which is then implemented using EAP-TLS (over PKMv2 in the WiMAX protocol), or by combined device and subscriber authentication, implemented using EAP-TTLS.

Exemplary embodiments of this invention constrain access to the private key of the WiMAX device so that TLS client authentication is possible only when presented with a correct operator's certificate. In this manner device authentication is made possible only in a correct and intended WiMAX operator's network.

Figure 1:
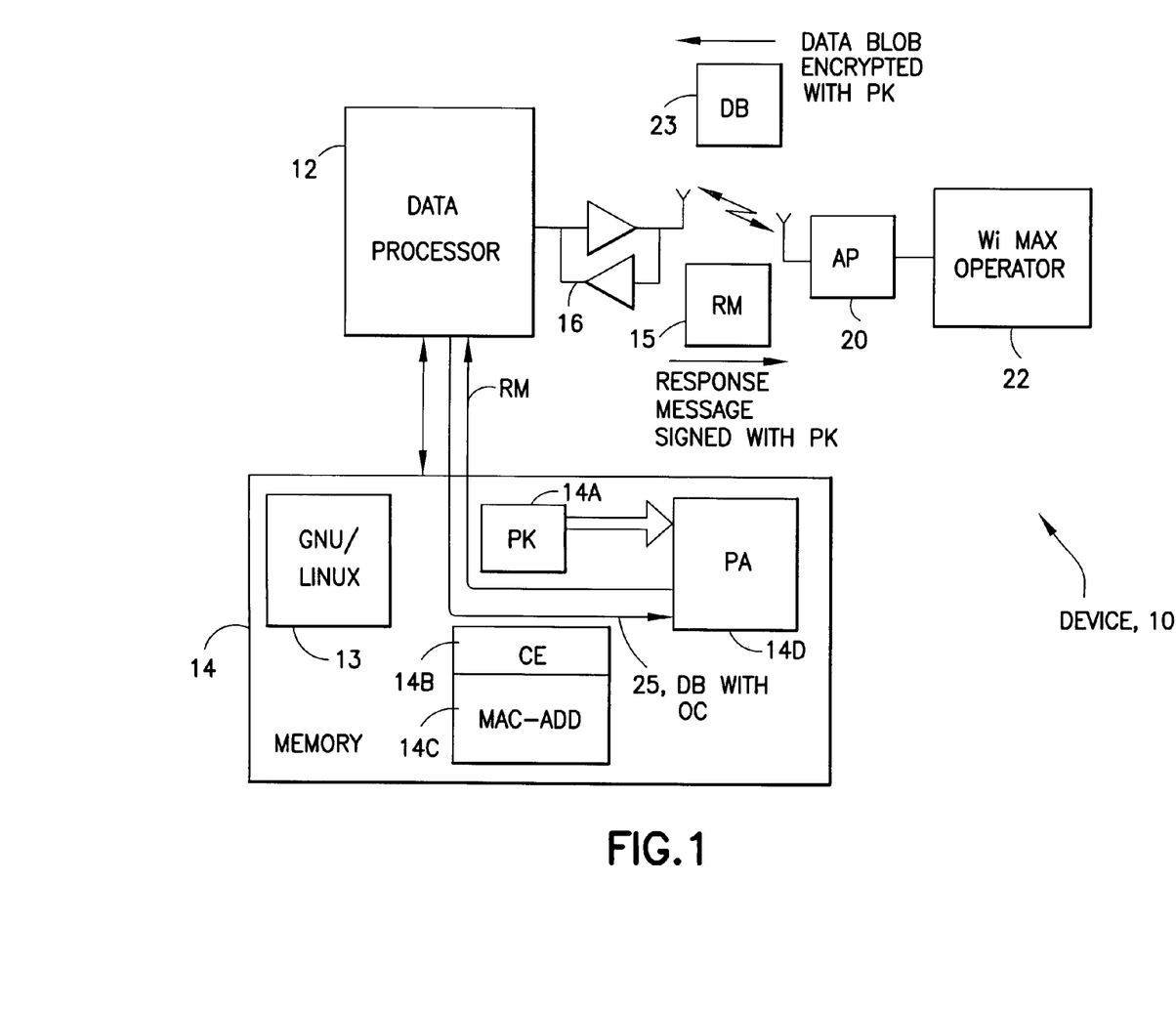
FIG. 1 shows a simplified block diagram of various electronic devices that are suitable for use in practicing the exemplary embodiments of this invention.

Referring to FIG. 1, a WiMAX device 10 can be assumed to include a data processor (controller) 12 that contains or that is connected with at least one memory device 14. Coupled with the data processor 12 is a suitable WiMAX-capable radio frequency transceiver 16 for conducting bi-directional wireless communications with an access point 20 associated with a WiMAX network operator 22. The memory device 14 is assumed to include a GNU/Linux (as one non-limiting example of an operating system) subsystem or module 13.

In accordance with exemplary aspects of this invention the memory device 14 is further provisioned with a device private key (PK) 14A and a certificate (CE) 14B, such as during manufacturing. The certificate 14B contains a MAC address (MAC_ADD) 14C of the device 10, and the private key 14A is used to authenticate the ownership of the MAC address 14C to the network operator 22 using, as non-limiting examples, EAP-TLS or EAP-TTLS procedures during network entry.

The private key 14A is assumed to be stored in a secure storage area of the memory 14, and is further assumed to be available only to a specific secure protected application (PA) 14D.

In general, the use of secure processing environments is known in the art. One suitable, but non-limiting type of protected application 14D is one implemented in a mobile device platform known as BB5, which is used by Nokia Corporation.

Another non-limiting example is ARM® TrustZone®. A consideration for any selected approach is that there is provided a trusted execution environment that is external to the open operating system. Other techniques to provide a secure environment include using a smart card, such as one engineered as a multi-application SIM, or using a virtualization layer (a hypervisor) between the processor and operating system. In this case a semi-secure execution environment is implemented in software alongside the operating system and on top of the virtualization layer. Any of these techniques, or others, may be employed to provide the secure protected application 14D.

When the subsidy lock is to be enabled, the operator 22 sends a data blob (DB) 23 to the device 10, encrypted with the device private key 14A. The received data blob 23 is directly passed to the protected application 14D. The protected application 14D decrypts the data blob 23 using the private key 14A to obtain a lock configuration, and discovers an operator certificate (OC) 25 which specifies the network 22 where locking is to be accomplished. The protected application 14D enables the lock and signs a response message (RM) 15 with the private key 14A, which is transmitted back to the operator 22. The operator 22 thus affirmatively knows that locking has been accomplished in the device 10 when it receives the signed response message 15.

Further in this regard, when the lock is enabled the protected application 14D stores (in a secure non-volatile storage space accessible only to the protected application 14A, or at a secure separate location where it can be retrieved when necessary) an indication that private key operations are only to be allowed if the data used for Certificate Response calculation contains the correct certificate. Thus, by "enabling the lock" the protected application 14D basically performs operations of setting a status register and storing the operator certificate 25. The operation of enabling the lock is performed when the operator 22 desires to enable the lock, and may be a one time action. Note, however, that there may be subsequent de-locking and re-locking messages from the operator 22, for example, if the user's subscription is changed. After the lock has been enabled, the actual authentication of the device 10 is subject to the operator 22 presenting the correct operator certificate 25, and the behavior of the protected application 14D will be different depending on whether the lock is enabled or is not enabled. In this sense, the lock is "used" each time the device 10 is authenticated to the network 22.

During operation of the device 10 when making a network access, and when performing EAP-TLS or EAP-TTLS (or possibly also TLS) authentication, the operator 22 requests client (device 10) authentication. The TLS protocol is implemented in the GNU/Linux module 13, except for the CertificateVerify TLS handshake message (see TLS Protocol, Version 1.0, T. Dierks, C. Allen, January 1999, RFC 2246 section 7.4.8), which can only be calculated in the protected application 14D. This calculation requires all preceding handshake messages, which are passed to the protected application 14D from GNU/Linux module 13, as well as access to the private key 14A. Note that while TLS, EAP-TLS and EAP-TTLS are all different protocols they all share the same messages originally defined in TLS.

Before the calculation is performed the protected application 14D checks that the preceding handshake messages contain the correct operator certificate 25 (contained in the certificate message from the operator server). This check is preferably performed by direct comparison, and no certificate chain validation, or X.509 parsing, need be performed. Note that the validation is done in the Linux TLS implementation, although it is superfluous in a locked device. If the correct operator certificate 25 is present, the protected application 14D calculates the CertificateVerify message using the inputs that were provided, in addition to the device private key 14A which it has access to, and returns the CertificateVerify message to the Linux TLS implementation.

Further in this regard, note that the operator certificate 25 that is used for the locking operation is originally sent to the device 10 in the data blob 23 that enables the lock (and is stored in protected application 14D secure storage for reference). Subsequently, when performing authentication of the device 10 to the network, the operator 22 sends the same operator certificate again as part of TLS handshake messages. If the two operator certificates match (i.e., the one sent to authenticate the device matches the one saved in secure storage that was sent as part of the data blob 23 to initiate the locking procedure), the protected application 14D creates the CertificateVerify message.

If the operator certificate 25 is incorrect, the protected application 14A returns an error, as the CertificateVerify message cannot be calculated and the TLS handshake fails. In this case network access is not granted to the device 10.

It can be noted in the foregoing description that the protected application 25 does not execute the entire TLS handshake, and therefore does not actually authenticate the operator 22 based on the private key 14A, as it only needs to perform the comparison of the operator certificate 25 and to calculate the Certificate Verify message.

Note further that if a man-in-the-middle attacker were to change the operator certificate 25 during the TLS handshake procedure between the device 10 and the network 22, the TLS handshake will fail in the final messages and network access is not granted.

It can also be noted that if a certain network 22 does not require device authentication, this can be accommodated by initializing timers in the WiMAX device that expire if a proper operator certificate 25 has not been supplied.

As further enhancements to the foregoing exemplary embodiments, certain modifications may be made to facilitate roaming. For example, the data blob 23 that configures the locking mechanism may contain, instead of a single operator certificate 25, a plurality of operator certificates. For example, the plurality of operator certificates may be received as a list of cryptographic one-way hashes of the certificate of the operator 22, and also one-way hashes of all of operator's roaming partners. The use of hashes is an optimization to conserve storage space, which may be restricted in the protected application 14A, and is not required. Other compression techniques may be used as well. When the protected application 14D checks the operator certificate 25 in the handshake message, it hashes the presented certificate and compares the result to the list of stored hashes. If a match is found to one of them the CertificateVerify is calculated as described above.

It should be appreciated that the exemplary embodiments of this invention may be implemented at least in part by computer software executable by the DP 12 of the device 10, and/or by hardware, and/or by a combination of software and hardware.

In general, the various embodiments of the device 10 can include, but are not limited to, wireless voice and/or data communication terminals, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Such communication capabilities may be for example to WiMAX or WLAN/WiFi (EEEE 802.11) networks, where the WLAN/WiFi network uses EAP-TLS or EAP-TTLS. In this case, the initializing timers noted above would be required for WLAN operation.

The memory 14 may be of any type suitable to the local technical environment and may be implemented using any suitable data storage technology, such as semiconductor-based memory devices, magnetic memory devices and systems, optical memory devices and systems, fixed memory and removable memory as non-limiting examples. The data processor 12 may also be of any type suitable to the local technical environment, including microprocessors, digital signal processors (DSPs) and processors based on a multi-core processor architecture, as non-limiting examples.

Figure 2:
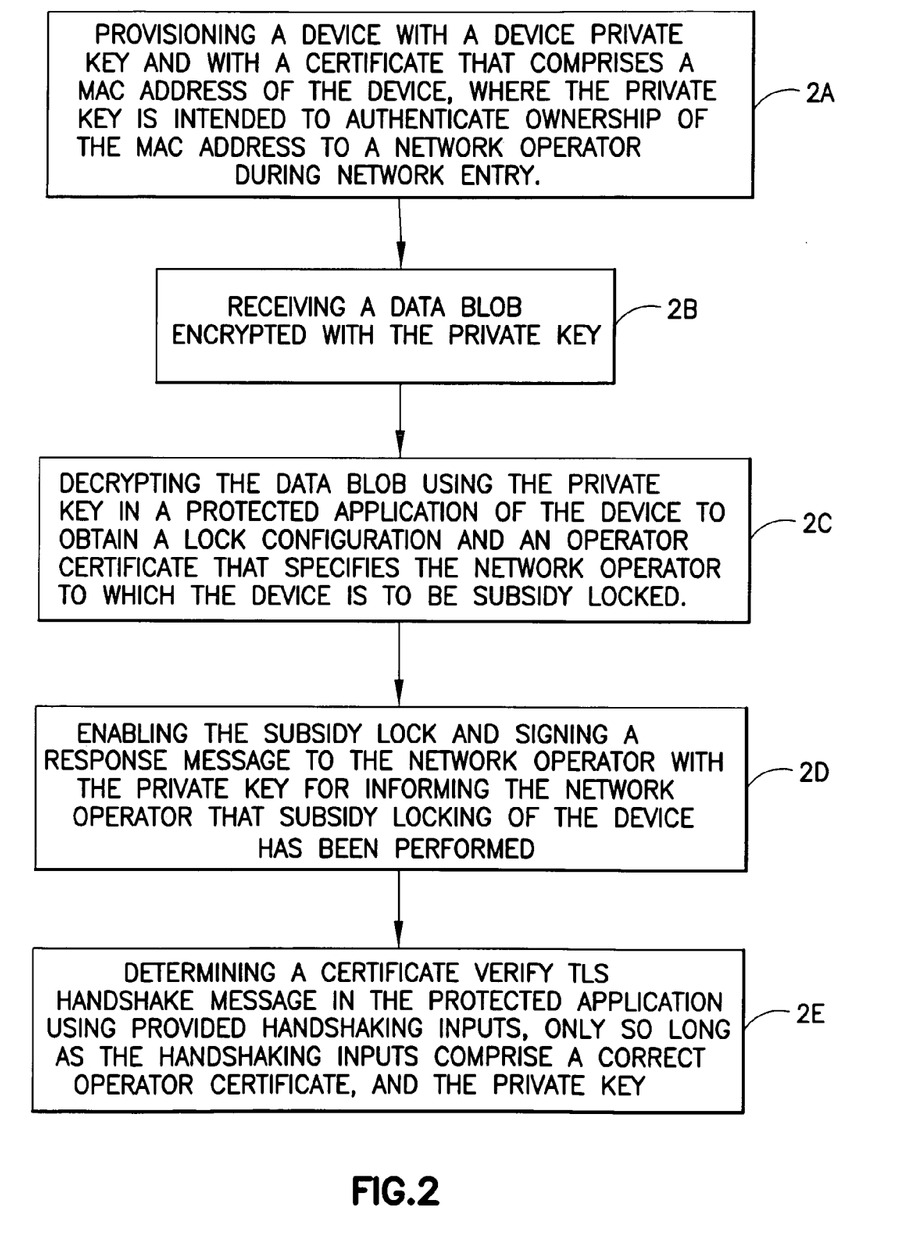
FIG. 2 is a logic flow diagram that is descriptive of a method, and the operation of a computer program product, to subsidy lock a device to a network operator in accordance with the exemplary embodiments of this invention.

Based on the foregoing it should be apparent that the exemplary embodiments of this invention provide a method, apparatus and computer program product(s) to subsidy lock a device to a network operator. Referring to FIG. 2, a method (an operation of a computer program product) includes: (Block 2A) provisioning the device with a device private key and with a certificate that comprises a MAC address of the device, where the private key is intended to authenticate ownership of the MAC address to the network operator during network entry; (Block 2B) receiving a data blob encrypted with the private key; (Block 2C) decrypting the data blob using the private key in a protected application of the device to obtain a lock configuration and an operator certificate that specifies the network where subsidy locking is to be accomplished; and (Block 2D) enabling the subsidy lock and signing a response message to the network operator with the private key for informing the network operator that subsidy locking of the device has been performed.

The method and computer program product as in the preceding paragraph, further comprising: (Block 2E) determining a CertificateVerify TLS handshake message in the protected application using provided handshaking inputs, only so long as the handshaking inputs comprise a correct operator certificate, and the private key.

The method and computer program product as in the preceding paragraph, where correctness of the operator certificate is determined in the protected application by direct comparison.

The method and computer program product as in the preceding paragraphs, where decrypting the data blob using the private key in the protected application of the device obtains a plurality of operator certificates, and where determining a CertificateVerify TLS handshake message in the protected application is accomplished only so long as the handshaking inputs comprise an operator certificate that matches one of the operator certificates.

The method and computer program product as in the preceding paragraph, where the plurality of operator certificates comprise certificates belonging to the network operator to which the device is to be subsidy locked, and one or more roaming partners of the network operator.

The method and computer program product as in the preceding two paragraphs, where the plurality of operator certificates are received in the form of one-way hashes.

The method and computer program product as in the preceding paragraphs, where the network operator is a WiMAX network operator.

Figure 3:
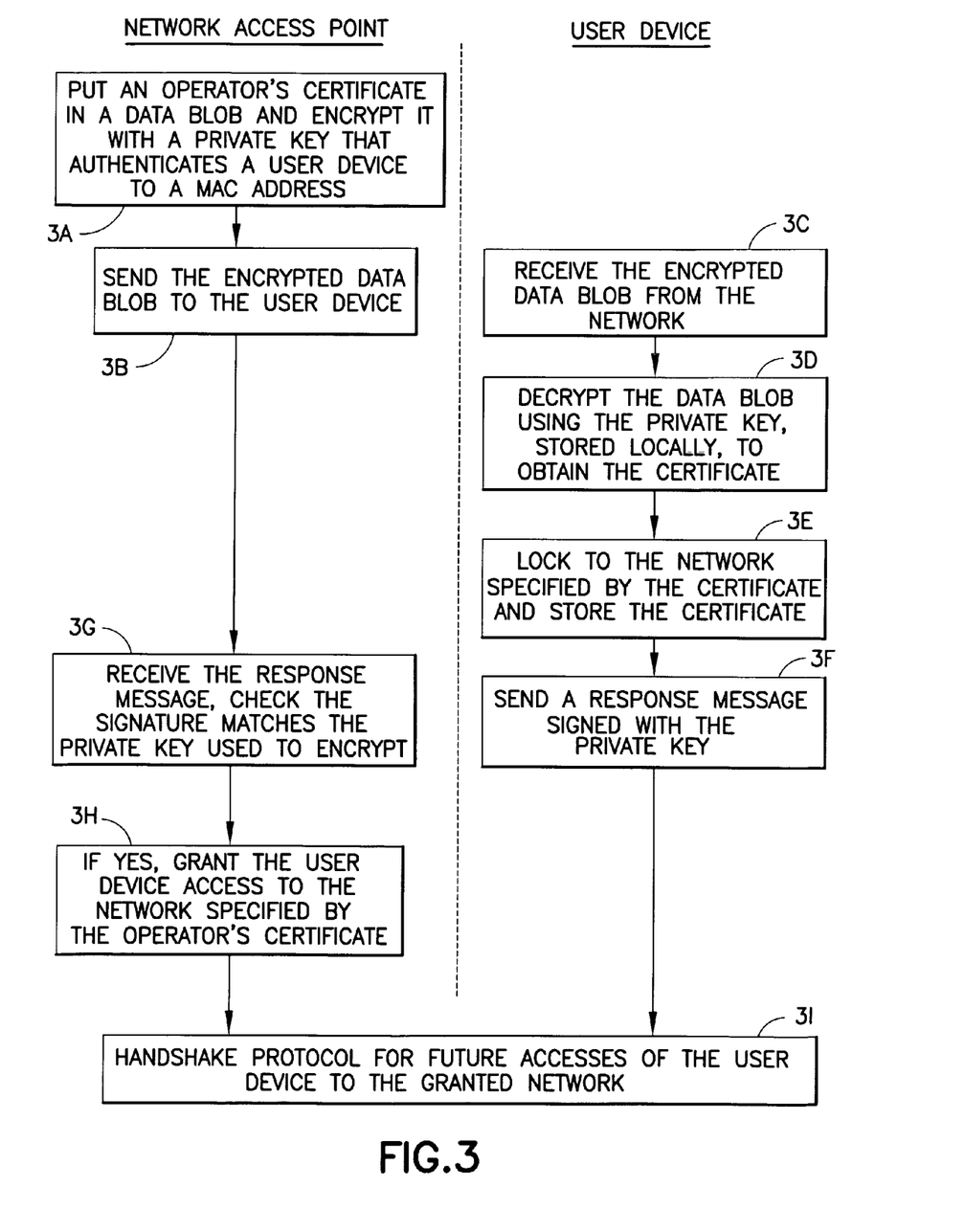
FIG. 3 is a logic flow diagram summarizing aspects of the network and of the user device relative to one another.

FIG. 3 presents a process flow diagram showing actions of the network access point and of the user device in chronological relation. At block 3A the network puts an operator's certificate in a data blob and encrypts it with a private key, which as above that private key authenticates a user device to a MAC address. At block 3B the network sends the encrypted data blob to the user device and at block 3C the user device receives it. At block 3D the user device decrypt the data blob using the private key, which it stores locally, and thereby obtains the certificate. At block 3E the user device locks to the network specified by the certificate and stores the certificate for future use (e.g., with the handshake protocol of block 3I), and then sends at block 3F a response message that is signed with the private key. At block 3G the network receives the response message and checks the signature used to sign the response message to make sure that it matches with the private key that the network originally used to encrypt the data blob. As detailed above, the response message indicates to the network that the user device has been subsidy locked to the network which was specified by the operator's certificate. Only if the signature on the response message matches the private key used to encrypt the data blob, at block 3H the network grants the user device access to the network that is specified by the operator's certificate.

The various blocks shown in FIGS. 2 and 3 may be viewed as method steps, and/or as operations that result from operation of computer program code, and/or as a plurality of coupled logic circuit elements and functions constructed to carry out the associated function(s), such as in an integrated circuit.

Below are numbered clauses describing various exemplary embodiments of the invention.

Clause 1: A method comprising: receiving an encrypted data blob at a device; decrypting the data blob using a private key that is locally stored in the device to obtain an operator's certificate from the data blob; locking the device to a network specified by the operator's certificate; and sending a response message signed with the private key.

Clause 2: The method of clause 1, wherein the decrypting, locking and signing of the response message with the private key are executed within a protected application that is locally stored in the device.

Clause 3: The method of clause 2, further comprising storing the operator's certificate in the protected application, and thereafter accessing the network specified by the operator's certificate by: receiving a request for device authentication that includes an operator's certificate; in the protected application, comparing the operator's certificate received in the request to the operator's certificate stored in the protected application, and only if they match; then creating and sending a certificate verify handshake message.

Clause 4: The method of clause 3, wherein the data blob includes a plurality of operator certificates, and wherein comparing comprises comparing the operator's certificate received in the request to any of the operator's certificates of the data blob and stored in the protected application, and only if any one of them matches; then creating and sending the certificate verify handshake message.

Clause 5: The method of clause 4, wherein the plurality of operator certificates in the data blob are in the form of one-way hashes.

Clause 6: The method of clause 1, wherein the private key authenticates ownership by the device of a device address that is stored in the local memory of the device.

Clause 7: The method of clause 1, wherein the device comprises a WiMAX device and the network comprises a WiMAX network.

Clause 8: The method of clause 1, wherein the private key is not stored in a removable subscriber identity module SIM card.

Clause 9: An apparatus comprising: a memory storing a private key; a receiver configured to receive an encrypted data blob; a processor configured to decrypt the data blob using the private key and thereby obtain from the data blob an operator's certificate, and to lock the apparatus to a network specified by the operator's certificate; and a transmitter configured to send a message signed with the private key once the apparatus is locked to the network.

Clause 10: The apparatus of clause 9, further comprising a protected application stored in the memory, and the processor decrypts the data blob, locks the apparatus, and signs the message with the private key within the protected application.

Clause 11: The apparatus of clause 10, wherein the processor is further configured to store the operator's certificate in the protected application, and thereafter for accessing the network specified by the operator's certificate: the receiver is configured to receive a request for device authentication that includes an operator's certificate; in the protected application, the processor is configured to compare the operator's certificate received in the request to the operator's certificate stored in the protected application, and only if they match; then the processor is configured to create and the transmitter is configured to send a certificate verify handshake message.

Clause 12: The apparatus of clause 11, wherein the processor obtains from the data blob a plurality of operator certificates, and compares the operator's certificate received in the request to any of the operator's certificates of the data blob that are stored in the protected application, and only if any one of them matches then the processor is configured to create the certificate verify handshake message.

Clause 13: The apparatus of clause 12, wherein the plurality of operator certificates in the data blob are in the form of one-way hashes.

Clause 14: The apparatus of clause 9, wherein the private key authenticates ownership by the apparatus of a device address that is stored in the local memory of the apparatus.

Clause 15: The apparatus of clause 9, wherein the apparatus comprises a portable WiMAX apparatus.

Clause 16: The apparatus of clause 9, wherein the memory storing the private key is not a removable subscriber identity module SIM card.

Clause 17: A memory embodying a computer program executable by a digital processing apparatus to perform operations directed to locking a device to a network, the operations comprising: decrypting a received encrypted data blob using a private key that is locally stored on a device to obtain an operator's certificate from the data blob; locking the device to a network specified by the operator's certificate; and sending a response message signed with the private key.

Clause 18: The memory of clause 17, wherein the decrypting, locking and signing of the response message with the private key are executed within a protected application that is locally stored in the device.

Clause 19: The memory of clause 18, the operations further comprising storing the operator's certificate in the protected application, and thereafter accessing the network specified by the operator's certificate by: receiving a request for device authentication that includes an operator's certificate; in the protected application, comparing the operator's certificate received in the request to the operator's certificate stored in the protected application, and only if they match; then creating and sending a certificate verify handshake message.

Clause 20: The memory of clause 19, wherein the data blob includes a plurality of operator certificates, and wherein comparing comprises comparing the operator's certificate received in the request to any of the operator's certificates of the data blob and stored in the protected application, and only if any one of them matches; then creating and sending the certificate verify handshake message.

Clause 21: The memory of clause 17, wherein the private key authenticates ownership by the device of a device address that is stored in the local memory of the device.

Clause 22: The memory of clause 17, wherein the device comprises a WiMAX device and the network comprises a WiMAX network.

Clause 23: An apparatus comprising: memory means for storing a private key; receiving means for receiving an encrypted data blob; processing means for decrypting the data blob using the private key and thereby obtaining from the data blob an operator's certificate, and for locking the apparatus to a network specified by the operator's certificate; and sending means for sending a message signed with the private key once the apparatus is locked to the network.

Clause 24: The apparatus of clause 23, wherein: the memory means comprises a protected application embodied on a local memory of the apparatus; the receiving means comprises a wireless receiver; the processing means comprises a digital processor; and the sending means comprises a wireless transmitter.

Clause 25: A method comprising: encrypting a data blob with a private key, the data blob comprising an operator's certificate which specifies a network; sending the encrypted data blob to a user device; receiving from the user device a response message signed with the private key that indicates the user device has been locked to the network specified by the operator's certificate; and responsive to receiving the response message, granting the user device access to the network that is specified by the operator's certificate.

Clause 26: The method of clause 25, wherein the private key authenticates ownership by the user device of a media access control MAC address.

Clause 27: The method of clause 25, wherein the data blob comprises a plurality of operator's certificates which together specify a set of networks that are roaming partners with one another.

Clause 28: The method of clause 27, wherein the plurality of operator's certificates in the data blob are in the form of one-way hashes.

Clause 29: The method of clause 25, executed by an access point of a WiMAX network that is specified by the operator's certificate.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the WiMAX system, it should be appreciated that the exemplary embodiments of this invention are not limited for use with only this one particular type of wireless communication system, and that they may be used to advantage in other wireless communication systems.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
   decrypting, by a protected application of an apparatus, a received encrypted data blob using a private key that is locally stored in a secure storage area of the apparatus to obtain an operator's certificate from the data blob, wherein the operator's certificate specifies a network;
   locking, by the protected application, the apparatus to the network specified by the operator's certificate, wherein locking the apparatus to the network comprises storing the operator's certificate in the secure storage area of the apparatus, wherein upon locking the protected application allows private key operations upon verification of the operator's certificate; and
   sending, by the apparatus, a response message signed with the private key, wherein the signing of the response message with the private key is executed within the protected application that is locally stored on the apparatus.

2. The method of claim 1, further comprising storing the operator's certificate in the protected application, and thereafter accessing the network specified by the operator's certificate by:
   receiving a request for device authentication, wherein the request includes a received operator's certificate;
   in the protected application, comparing the received operator's certificate to the operator's certificate stored in the protected application; and
   only if they match, creating and sending a certificate verification handshake message.

3. The method of claim 2, wherein the data blob includes a plurality of representations of operator certificates, and wherein the comparing comprises comparing the received operator's certificate to at least one of the plurality of representations of the operator's certificates of the data blob and stored in the protected application; and
   only if at least one of them matches, creating and sending the certificate verification handshake message.

4. The method of claim 3, wherein the plurality of representations of operator certificates in the data blob comprise one-way hashes.

5. The method of claim 1, wherein the private key authenticates ownership by the apparatus of a device address that is stored in the local memory of the apparatus.

6. The method of claim 1, wherein the apparatus comprises a WiMAX device and the network comprises a WiMAX network.

7. The method of claim 1, wherein the private key is not stored in a removable subscriber identity module SIM card.

8. The method of claim 1, further comprising: receiving, by the apparatus, the encrypted data blob from another apparatus via a wireless communication link.

9. An apparatus comprising:
a memory storing a private key in a secure storage area;
a processor configured, with a protected application stored in the memory, to decrypt a received encrypted data blob using the private key and thereby obtain from the data blob an operator's certificate, wherein the operator's certificate specifies a network, wherein the processor is further configured, with the protected application, to lock the apparatus to the network specified by the operator's certificate, wherein the processor locking the apparatus to the network comprises storing the operator's certificate in the secure storage area of the memory, wherein upon locking the protected application allows private key operations upon verification of the operator's certificate; and
a transmitter configured to send a response message signed with the private key, wherein the signing of the response message with the private key is executed within the protected application that is locally stored on the apparatus.

10. The apparatus of claim 9, wherein the processor is further configured to store the operator's certificate in the protected application, and thereafter for accessing the network specified by the operator's certificate:
the receiver is configured to receive a request for device authentication, wherein the request includes a received operator's certificate;
in the protected application, the processor is configured to compare the received operator's certificate to the operator's certificate stored in the protected application; and
only if they match, the processor is configured to create and the transmitter is configured to send a certificate verification handshake message.

11. The apparatus of claim 10, wherein the processor obtains from the data blob a plurality of representations of operator certificates, and compares the received operator's certificate to at least one of the plurality of representations of the operator's certificates of the data blob that are stored in the protected application, and only if at least one of them matches then the processor is configured to create the certificate verification handshake message.

12. The apparatus of claim 11, wherein the plurality of representations of operator certificates in the data blob comprise one-way hashes.

13. The apparatus of claim 9, wherein the private key authenticates ownership by the apparatus of a device address that is stored in the memory of the apparatus.

14. The apparatus of claim 9, wherein the apparatus comprises a portable WiMAX apparatus.

15. The apparatus of claim 9, wherein the memory storing the private key is not a removable subscriber identity module SIM card.

16. A memory embodying a computer program executable by a digital processing apparatus to perform operations directed to locking an apparatus to a network, the operations comprising:
decrypting, by a protected application of the apparatus, a received encrypted data blob using a private key that is locally stored in a secure storage area on the apparatus to obtain an operator's certificate from the data blob, wherein the operator's certificate specifies a network;
locking, by the protected application, the apparatus to the network specified by the operator's certificate, wherein locking the apparatus to the network comprises storing the operator's certificate in the secure storage area of the apparatus, wherein upon locking the protected application allows private key operations upon verification of the operator's certificate; and
sending a response message signed with the private key, wherein the signing of the response message with the private key is executed within the protected application that is locally stored on the apparatus.

17. The memory of claim 16, the operations further comprising storing the operator's certificate in the protected application, and thereafter accessing the network specified by the operator's certificate by:
receiving a request for device authentication, wherein the request includes a received operator's certificate;
in the protected application, comparing the received operator's certificate to the operator's certificate stored in the protected application; and
only if they match, creating and sending a certificate verification handshake message.

18. The memory of claim 17, wherein the data blob includes a plurality of representations of operator certificates, and wherein comparing comprises comparing the received operator's certificate to at least one of the plurality of representations of the operator's certificates of the data blob and stored in the protected application; and
only if at least one of them matches, creating and sending the certificate verification handshake message.

19. The memory of claim 16, wherein the private key authenticates ownership by the apparatus of a device address that is stored in the local memory of the apparatus.

20. The memory of claim 16, wherein the apparatus comprises a WiMAX device and the network comprises a WiMAX network.

21. An apparatus comprising:
memory means for storing a private key in a secure storage area;
processing means, with a protected application stored in the memory means, for decrypting a received encrypted data blob using the private key and thereby obtaining from the data blob an operator's certificate, wherein the operator's certificate specifies a network, and for locking the apparatus to a network specified by the operator's certificate, wherein locking the apparatus to the network comprises storing the operator's certificate in the secure storage area of the apparatus, wherein upon locking the protected application allows private key operations upon verification of the operator's certificate; and
sending means for sending a response message signed with the private key, wherein the signing of the response message with the private key is executed within the protected application that is locally stored on the apparatus.

22. The apparatus of claim 21, wherein:

the memory means comprises the protected application embodied on a local memory of the apparatus;

the processing means comprises a digital processor; and the sending means comprises a wireless transmitter.

23. A method comprising:

encrypting, by a network device, a data blob with a private key, the data blob comprising an operator's certificate that specifies a network;

sending the encrypted data blob from the network device to a user device;

receiving, by the network device, a response message signed with the private key from the user device, wherein the response message indicates that the user device has been locked to the network specified by the operator's certificate, wherein the user device being locked to the network comprises the user device having stored the operator's certificate in a secure storage area of the user device, wherein upon locking of the user device a protected application of the user device is configured to allow private key operations upon verification of the operator's certificate; and responsive to receiving the response message, granting, by the network device, the user device access to the network that is specified by the operator's certificate.

24. The method of claim 23, wherein the private key authenticates ownership by the user device of a media access control address.

25. The method of claim 23, wherein the data blob comprises a plurality of representations of operator's certificates which together specify a set of networks that are roaming partners with one another.

26. The method of claim 25, wherein the plurality of representations of operator's certificates in the data blob comprise one-way hashes.

27. The method of claim 23, wherein the network device executing the method comprises an access point of a WiMAX network that is specified by the operator's certificate.

* * * * *